United States Patent
Jones et al.

(10) Patent No.: US 8,127,022 B2
(45) Date of Patent: *Feb. 28, 2012

(54) SYSTEM AND METHOD TO IDENTIFY CUSTOMER PREMISES EQUIPMENT DEVICES

(75) Inventors: Kenneth Roger Jones, Cool, CA (US); Brian A. Gonsalves, Antioch, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/636,325

(22) Filed: Dec. 11, 2009

(65) Prior Publication Data

US 2010/0091961 A1  Apr. 15, 2010

Related U.S. Application Data

(63) Continuation of application No. 11/452,175, filed on Jun. 13, 2006, now Pat. No. 7,657,633, which is a continuation of application No. 10/700,337, filed on Nov. 3, 2003, now Pat. No. 7,085,838, which is a continuation-in-part of application No. 10/634,116, filed on Aug. 4, 2003, now Pat. No. 7,165,111.

(51) Int. Cl.
  G06F 15/16  (2006.01)
  G06F 15/173 (2006.01)
(52) U.S. Cl. ........ 709/227; 709/217; 709/219; 709/222; 709/229
(58) Field of Classification Search .................. 709/220, 709/223, 224, 226, 228; 705/1, 17; 713/1
See application file for complete search history.

(56) References Cited

U.S. PATENT DOCUMENTS

| | | | |
|---|---|---|---|
| 6,463,528 B1 | 10/2002 | Rajakarunanayake et al. | |
| 6,636,505 B1 | 10/2003 | Wang et al. | |
| 2002/0026504 A1* | 2/2002 | Lo | 709/220 |
| 2002/0095299 A1* | 7/2002 | Iwakata | 705/1 |
| 2002/0165972 A1 | 11/2002 | Chien et al. | |
| 2003/0053443 A1* | 3/2003 | Owens | 370/352 |
| 2003/0055959 A1* | 3/2003 | Sato | 709/224 |
| 2003/0097552 A1* | 5/2003 | Lewis et al. | 713/1 |
| 2003/0101243 A1* | 5/2003 | Donahue et al. | 709/226 |
| 2003/0131107 A1 | 7/2003 | Godse et al. | |
| 2003/0182414 A1* | 9/2003 | O'Neill | 709/223 |
| 2003/0233461 A1* | 12/2003 | Mariblanca-Nieves et al. | 709/228 |
| 2004/0093342 A1* | 5/2004 | Arbo et al. | 707/102 |
| 2004/0117834 A1 | 6/2004 | Karaoguz et al. | |
| 2004/0128201 A1* | 7/2004 | Ofir et al. | 705/17 |

OTHER PUBLICATIONS

International Search Report and Written Opinion of the International Searching Authority for International Application No. PCT/US04/33725, Mailed on August 29, 2005. Provided in U.S. Appl. No. 11/452,175.

* cited by examiner

Primary Examiner — Quang N. Nguyen
(74) Attorney, Agent, or Firm — Toler Law Group, PC

(57) ABSTRACT

A computer implemented method includes sending a request from a customer service terminal to a broadband remote access server to retrieve a device identifier of a customer premises equipment device. The device identifier is received by the broadband remote access server via a point to point protocol over ethernet active discovery initiation packet sent from the customer premises equipment device. The computer implemented method includes receiving, at the customer service terminal, a response from the broadband remote access server that includes the device identifier of the customer premises equipment device.

19 Claims, 11 Drawing Sheets

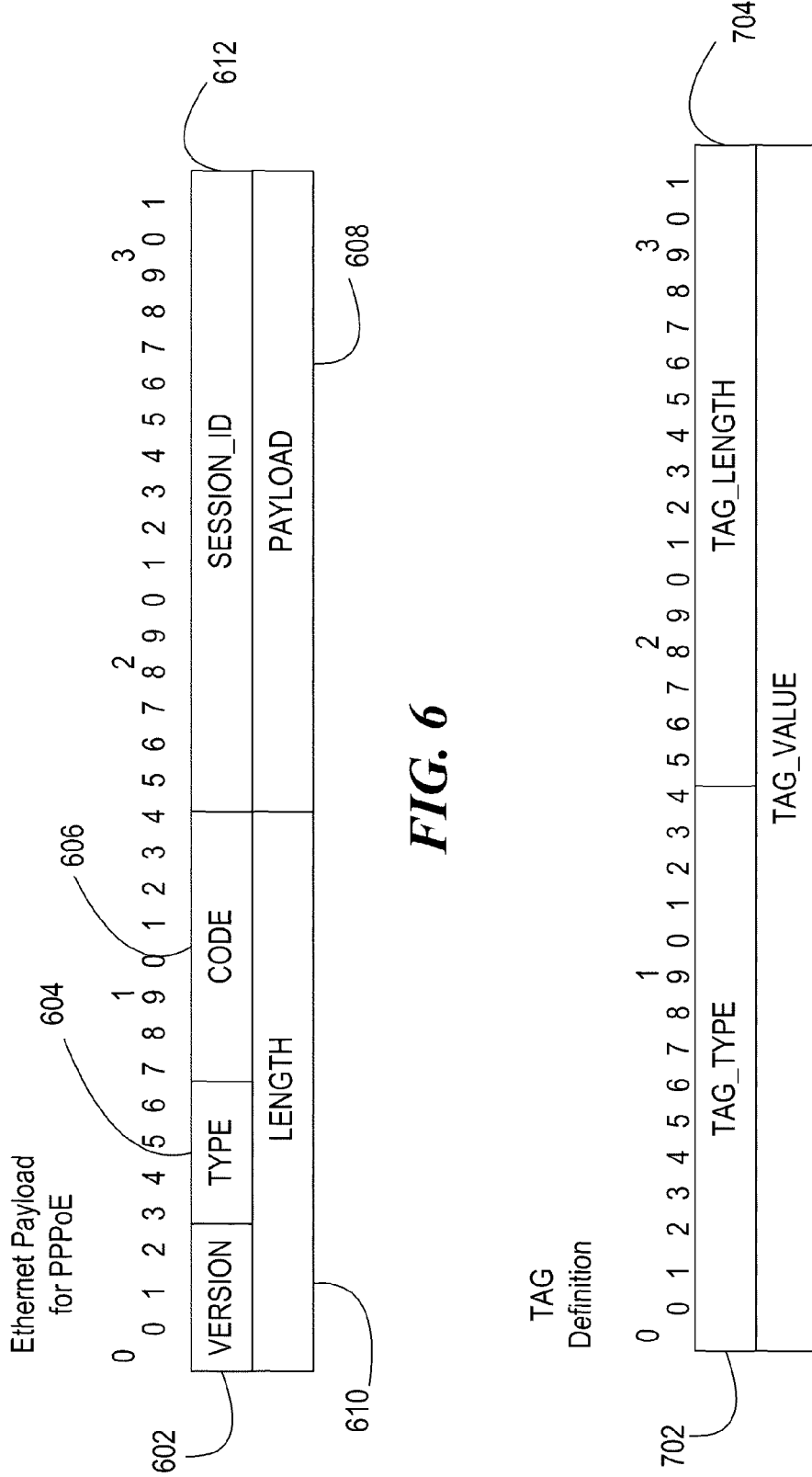

SYSTEM AND METHOD TO IDENTIFY CUSTOMER PREMISES EQUIPMENT DEVICES

CLAIM OF PRIORITY

This is a continuation application of, and claims priority from, U.S. patent application Ser. No. 11/452,175, (U.S. Pat. No. 7,657,633 issued on Feb. 2, 2010) filed on Jun. 13, 2006, which is a continuation of U.S. patent application Ser. No. 10/700,337, (U.S. Pat. No. 7,085,838 issued on Aug. 1, 2006) filed on Nov. 3, 2003, entitled "SYSTEM AND METHOD TO IDENTIFY CUSTOMER PREMISE EQUIPMENT DEVICES," which is a continuation-in-part application of U.S. patent application Ser. No. 10/634,116, (U.S. Pat. No. 7,165,111 issued on Jan. 16, 2007) filed on Aug. 4, 2003 entitled "SYSTEM AND METHOD TO IDENTIFY DEVICES EMPLOYING POINT-TO-POINT OVER ETHERNET ENCAPSULATION," the contents of which are expressly incorporated herein by reference in their entirety.

BACKGROUND

Broadband service providers for distributed computing network services such as digital subscriber line (DSL) service typically require the end user, e.g., the home or business DSL subscriber, to employ a router, switch, or other customer premises equipment (CPE) to terminate the DSL connection at the residence or business location. The router or other CPE serves to terminate the Asynchronous Transfer Mode (ATM) connection, and generally utilizes point-to-point-over-Ethernet (PPPoE) enabled software to complete the user authentication process.

When a DSL subscriber encounters a problem with their DSL connection, the DSL service provider has no way to automatically determine the specific make and/or model of a particular CPE device being utilized by the DSL subscriber. In this situation, telephone inquiries to the subscriber are made to attempt to discover what type of equipment is being utilized at the CPE location, or a service technician is dispatched to "eyeball" the equipment when the customer does not know what type of CPE device is at their location. Consider a typical case of tens of thousands (or even millions, in some cases) of DSL subscribers and their respective CPE devices, and the support problems presented to the DSL service provider become evident.

In addition, when a service provider wishes to upgrade DSL transport services in their service area(s), e.g., the provision of Point to Point Protocol Termination and Aggregation (PTA), it may be difficult to cost-effectively deploy the new service plan if the service provider does not know what types of CPE devices are currently deployed. For example, if a new transport service is scheduled for deployment in a specific geographic region, but it is determined that a large number of CPE devices may not support the new service, delays in deployment result. Such delays lead to increased provider costs, which are typically passed along to the subscribers, resulting in higher rates.

BRIEF DESCRIPTION OF THE DRAWINGS

FIG. 6 illustrates an Ethernet payload for point-to-point over Ethernet (PPPoE);

FIG. 7 illustrates a tag for use in an Ethernet payload;

The use of the same reference symbols in different drawings indicates similar or identical items.

DETAILED DESCRIPTION

Figure 1:
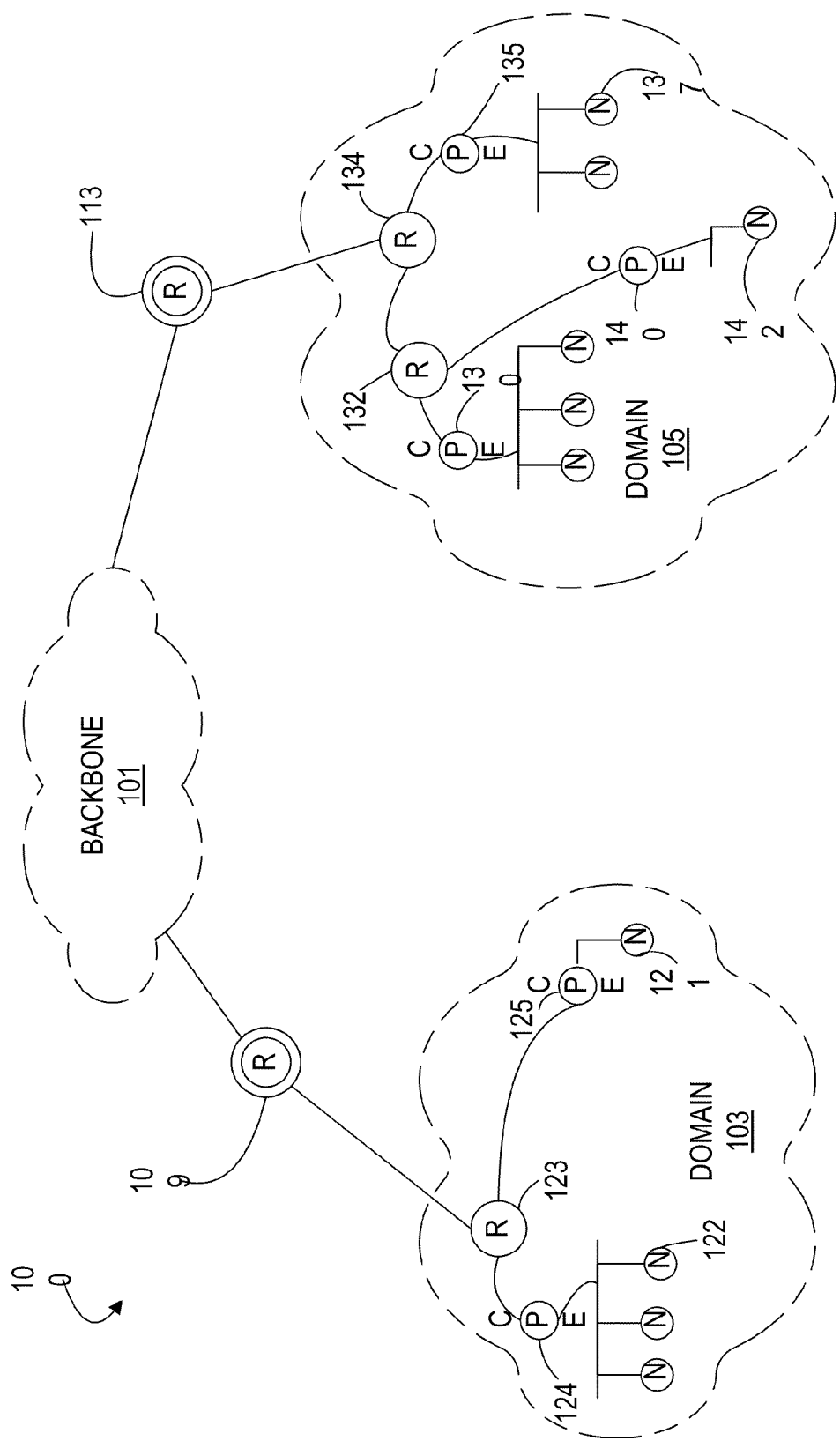
FIG. 1 is a simplified diagram of a distributed network.
Figure 9:
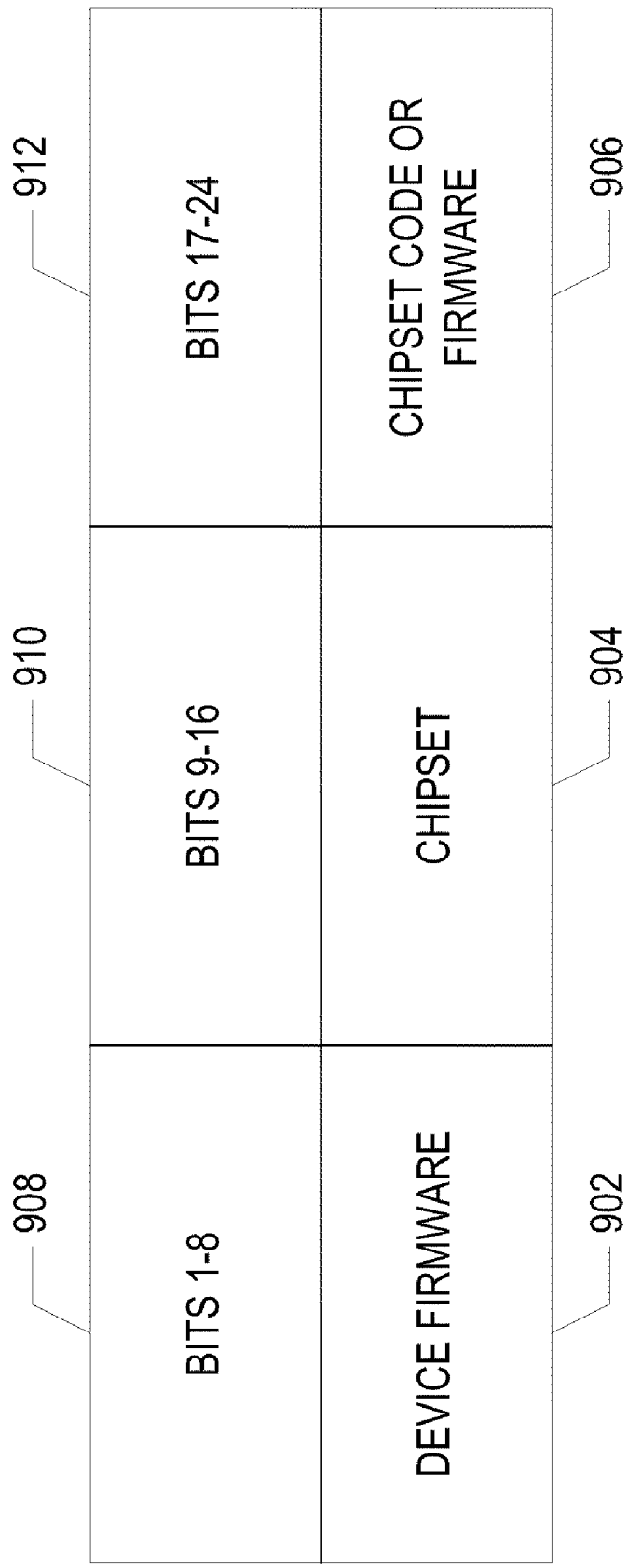
FIG. 9 illustrates an embodiment of a host-uniq tag that includes chipset and firmware information.

The present disclosure provides a method, system, and apparatus for use in identifying customer premises equipment (CPE) in a distributed network. The method utilizes a unique device identifier that is provided by a CPE device during the discovery stage of point-to-point over Ethernet (PPPoE) communications in a distributed network. A host server collects this CPE-provided information, which may be used by a broadband service provider to identify, and thus manage, the CPE devices which form a part of the service provider's network domain. An example of a distributed network system including a collection of domains with one or more networks is illustrated in FIG. 1. An exemplary device identifier includes chipset and firmware information regarding the DSL CPE and is illustrated in FIG. 9.

In a particular embodiment, a computer implemented method includes sending a request from a customer service terminal to a broadband remote access server to retrieve a device identifier of a Customer Premises Equipment (CPE) device. The device identifier is received by the broadband remote access server via a Point to Point Protocol over Ethernet (PPPoE) Active Discovery Initiation (PADI) packet sent from the CPE device. The computer implemented method includes receiving, at the customer service terminal, a response from the broadband remote access server that includes the device identifier of the CPE device.

In another particular embodiment, a system includes a broadband remote access server to receive a Point to Point Protocol over Ethernet (PPPoE) Active Discovery Initiation (PADI) packet from a Customer Premises (CPE) device, where the PADI packet includes a device identifier field associated with the CPE device, to transmit a PPPoE Active Discovery Offer (PADO) packet from the BRAS to the CPE device based on the device identifier field, to receive a PPPoE Active Discovery Request (PADR) from the CPE device at the BRAS, and to send a PPPoE Active Discover Session (PADS) packet from the BRAS to the CPE device to initiate an Ethernet-based communication session between the CPE device and the BRAS.

In another particular embodiment, a system includes a broadband remote access server to receive a Point to Point Protocol over Ethernet (PPPoE) Active Discovery Initiation (PADI) packet from a Customer Premises (CPE) device, the PADI packet including a host-uniq identifier associated with the CPE device, to transmit a PPPoE Active Discovery Offer (PADO) packet from the BRAS to the CPE device based on the type of the CPE device, to receive a PPPoE Active Discovery Request (PADR) from the CPE device at the BRAS, and to send a PPPoE Active Discover Session (PADS) packet from the BRAS to the CPE device.

FIG. 1 is a simplified example of a distributed network, and is referred to as distributed network system 100. Distributed network system 100 can include numerous routing domains 103 and 105, which are connected to a backbone network 101. In a hierarchically arranged network system, backbone 101 is the central connection path shared by the nodes and networks connected to it. The backbone 101 administers the bulk of traffic between communicating nodes to provide end-to-end service between one user, for example, source node 121 in domain 103, and another user, for example destination node 142.

Each routing domain 103, 105 in distributed network system 100 is a collection of one or more local networks that are attached to the backbone 101 through one or more routers 123, 124, 125, 130, 132, 134, and 135. A router is a specialized computer for processing Internet protocol (IP) data and forwarding IP data along respective network paths. In the following discussion, the term local network shall be used to refer to all types of networks that may be included in a domain. Routing domains 103 and 105 are also referred to as autonomous systems (AS). An autonomous system is a set of nodes and routers that operate under the same administration. The domains 103 and 105 may be operated by the same service provider (same administration) or by different service providers. The networks in routing domains 103 and 105 may be residence/subscribers' home networks, local area networks (LAN), wide area networks (WAN), metropolitan area networks (MAN), or the like.

In a point-to-point (PPP) connectivity network, various types and models of CPE devices such as CPE devices 124 and 125, or 130, 140, and 135 are used to terminate the point-to-point (PPP) connections. One type of point-to-point connectivity communications is point-to-point over Ethernet (PPPoE). With various types of broadband access, e.g. digital subscriber line (DSL) service, connectivity may be provided via PPPoE within the domains 103 and 105. It will be appreciated that the numbers of networks, routers, CPE devices, and nodes (nodes are depicted by a circle with 'N' inscribed within the circle) have been constrained in the example of FIG. 1 to avoid clutter.

Broadband access service, such as digital subscriber line (DSL) service, entails the use of a CPE device to terminate the DSL (PPPoE) connection at the residence or business location of the DSL subscriber. This is illustrated in FIG. 2, which illustrates a simplified diagram of a point-to-point connection being established.

Figure 2:
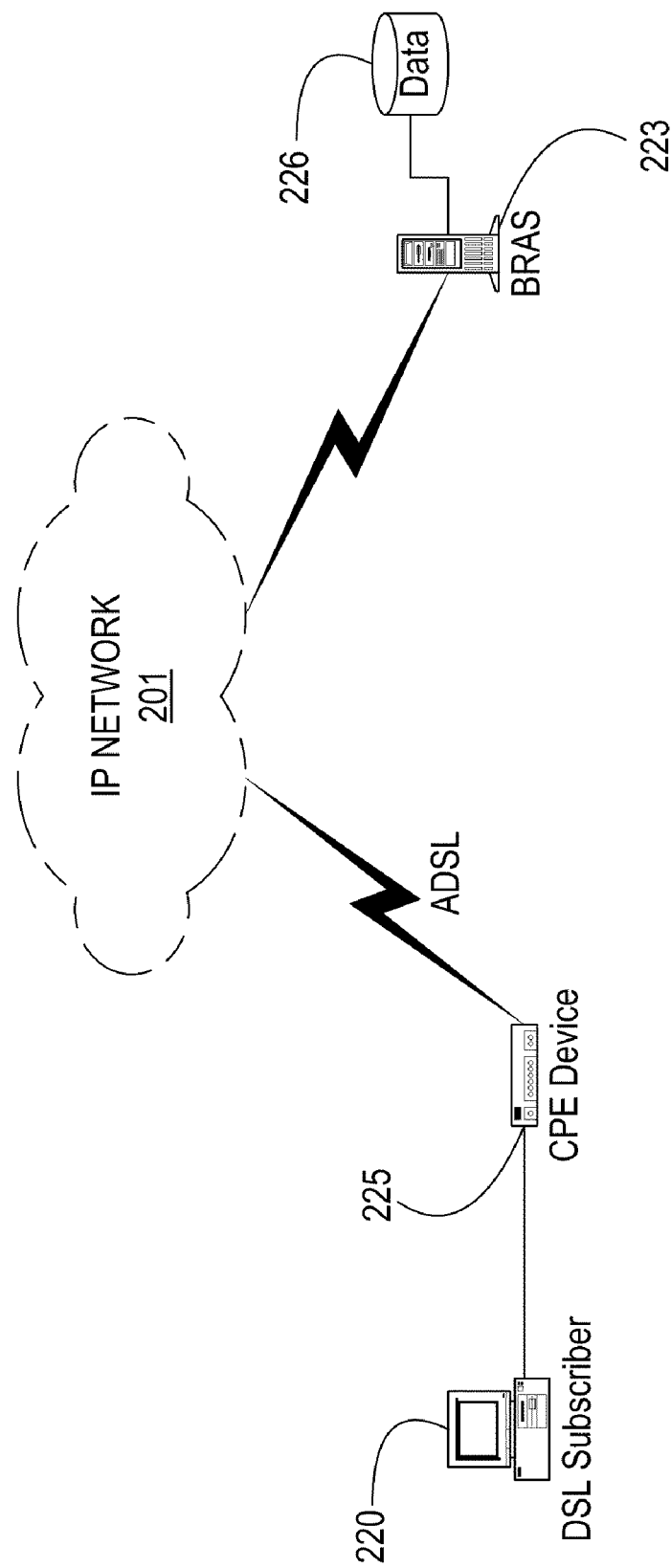
FIG. 2 is a simplified diagram of a customer premises equipment (CPE) device connected via an IP network to an access concentrator.

FIG. 2 illustrates a CPE device 225 connected through an IP network 201 to an access concentrator 223. In an embodiment, the access concentrator 223 is a broadband remote access server (BRAS).

Typically, the CPE device 225 terminates the asynchronous transfer mode (ATM) connection, and has point-to-point over Ethernet (PPPoE) software to complete a user authentication process. The CPE device 225 may be a router or a switch, or any device that terminates a PPPoE connection. The CPE device 225 contains a module configured to transmit a PPPoE packet including a tag to uniquely identify the CPE device 225 product model. Access concentrator 223 is connected to a database 226 to store the device identifier field data obtained from the CPE device 225 during discovery/ authentication processes. The method utilizes the packet exchange during the conduct of a PPPoE discovery process.

Figure 3:
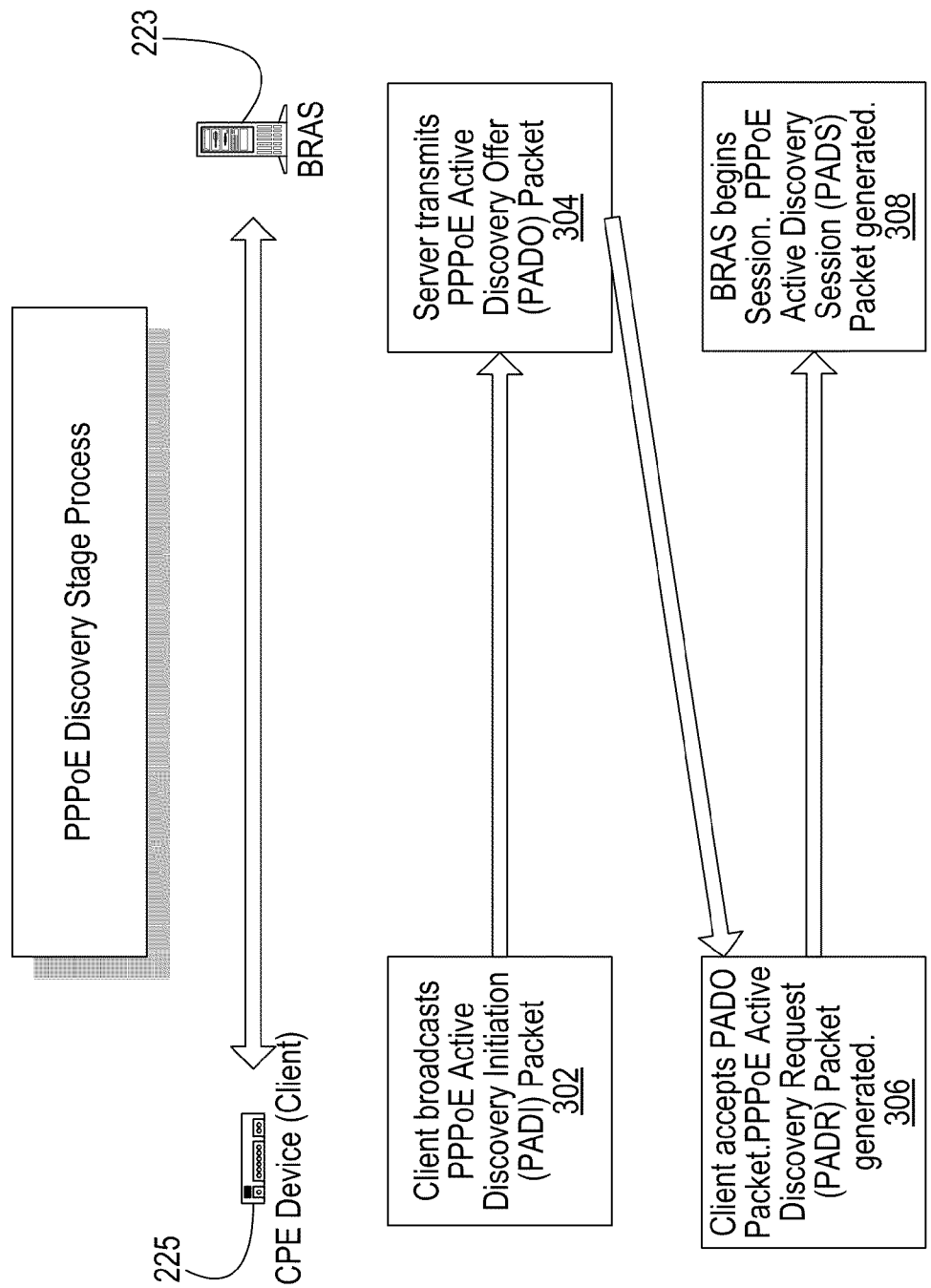
FIG. 3 is a flow diagram illustrating the stages of PPPoE discovery.

PPPoE has two distinct stages, a discovery stage, and a PPP session stage. When a host wishes to initiate a PPPoE session, it first performs discovery to identify the Ethernet media access control (MAC) address of the peer, and establishes a PPPoE SESSION_ID. Although PPP defines a peer-to-peer relationship, discovery is a client-server relationship. That is, in the discovery process, a host (the client, or CPE device 225) discovers an access concentrator 223 (the server), and various discovery steps are followed to permit the host and the server to have the information required to build their point-to-point connection over Ethernet. This discovery process is illustrated in FIG. 3.

The method and system disclosed herein utilizes a tag identified in Internet Engineering Task Force (IETF) RFC 2516 (A Method for Transmitting PPP over Ethernet (PPPoE)) in an innovative way to determine which CPE devices, such as CPE device 225, are connected to a network. The client (CPE 225) is capable of generating a device identifier code in response to receiving a PPPoE packet communicated over a distributed network. In the first step 302 of the discovery process, the CPE device 225 broadcasts a PPPoE active discovery initiation (PADI) packet. This PADI packet includes a tag that specifically identifies a product model of the CPE device 225. The tag in a particular embodiment is a host-uniq tag, and the device identifier code is a binary number associated with a specific product model or type of CPE device. In a specific embodiment, the binary number is a nine bit binary number.

The access concentrator 223, such as the broadband remote access server (BRAS), transmits a PPPoE active discovery offer (PADO) packet in step 304. In step 306, the PADO packet is received by the client 225, and accepted. In response to the PADO packet receipt, an active discovery request packet (PADR) packet is generated and transmitted to the server 223. The PADR packet can also include a tag that specifically identifies a product model of the CPE device 225. In step 308, the server receives the PADR packet, and generates and transmits a PPPoE active discovery session (PADS) confirmation packet. The session discovery process is concluded, and an Ethernet communication session is then conducted between the client 225 and the server 223.

The host-uniq tag information may be transmitted in the PADI packet. Alternatively, the host-uniq tag information may also be transmitted in the PADR packet. Generally it is most efficient to utilize the PADI packet for device identification, however, the CPE device could return the device identifier in the tag with a PADR packet as well. Whether the tag information is contained in the PADI or PADR packets, the access concentrator 223 receives the PAD packet, and stores the device identifier code in a database (226, FIG. 2). After collection of the device identifier codes in the tag, the database can be used to determine the specific product model of a CPE device based on the information embedded in the tag. This information is then available to be provided to customer service representatives to diagnose and repair user problems, thereby decreasing the number of customer site visits and subscriber call requests required of service technicians.

An advantage provided by the disclosed method is that it facilitates network management based upon the product model of the CPE devices determined to be present in the network. For example, the use of the host-uniq tag and the unique device identifier allows broadband service providers to check on the CPE devices in use on the provider's network. This information could be used to target marketing efforts, or to enable surveys of existing equipment to determine if the existing equipment will work with new technologies that a broadband service provider would like to deploy. It should be noted that although the examples provided thus far have discussed primarily DSL broadband services, PPPoE is an authentication system that is not restricted to DSL.

Figure 4:
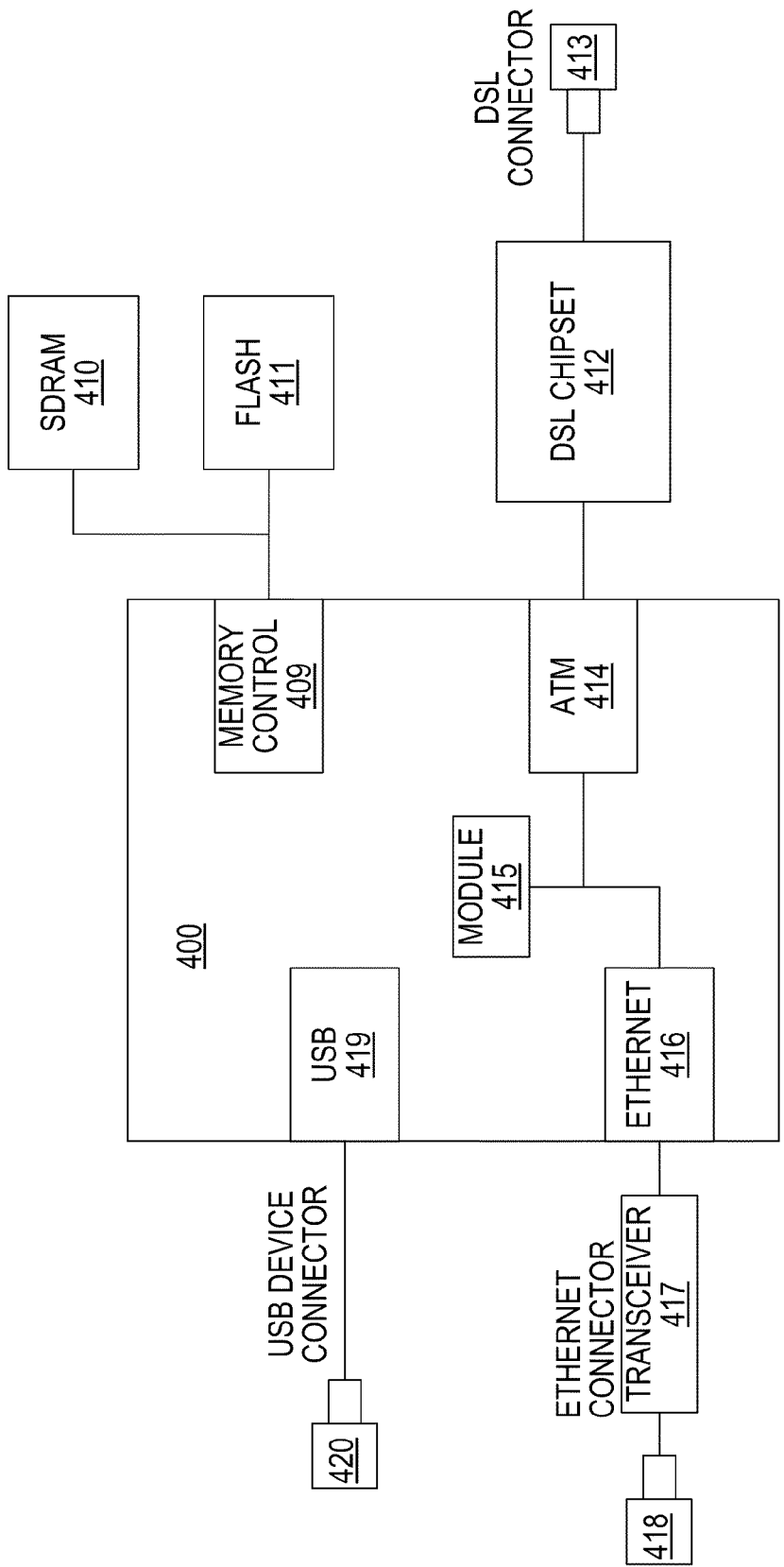
FIG. 4 is a block diagram of an ADSL bridge/router board which incorporates a module configured to transmit a point-to-point over Ethernet (PPPoE) active discovery packet, including a tag.

FIG. 4 is a block diagram of an ADSL bridge/router board 400 incorporating a module 415 configured to transmit a point-to-point over Ethernet (PPPoE) active discovery packet including a tag. In a particular embodiment, the tag comprises a device identifier field that uniquely identifies a CPE product model. It will be appreciated that, with the exception of module 415, the block diagram of FIG. 4 is provided as a generic example of an integrated microprocessor designed to meet the needs of communications applications, and as such does not represent the only architecture possible for CPE devices.

CPE board 400 includes a memory control module 409 with connecting Flash 411 and SDRAM 410 memory components. Other components in board 400 include a universal serial bus (USB) controller 419 and a USB device connector 420; an ATM segmentation and reassembly (SAR) controller module 414; a DSL chipset 412 and DSL connector 413; a 10/100 Mbps Ethernet controller module 416, transceiver 417, and connector 418. ATM controller module 414 and Ethernet controller module 415 have been integrated into the board 400 as network interfaces.

During a PPPoE discovery process, module 415 sends a PPPoE active discovery (PAD) packet. The PAD packet includes a tag comprising a device identifier field that uniquely identifies a CPE product model. The device identifier field can also be generated in response to receiving a PAD packet. The PAD packet containing the tag/device identifier can be a PADI packet, or alternately, a PADR packet. In one embodiment, the tag is a host-uniq tag, and the device identifier field comprises a predefined binary number embedded in the host-uniq tag. This predefined binary number can be a nine-bit binary device identifier code.

Figure 5:
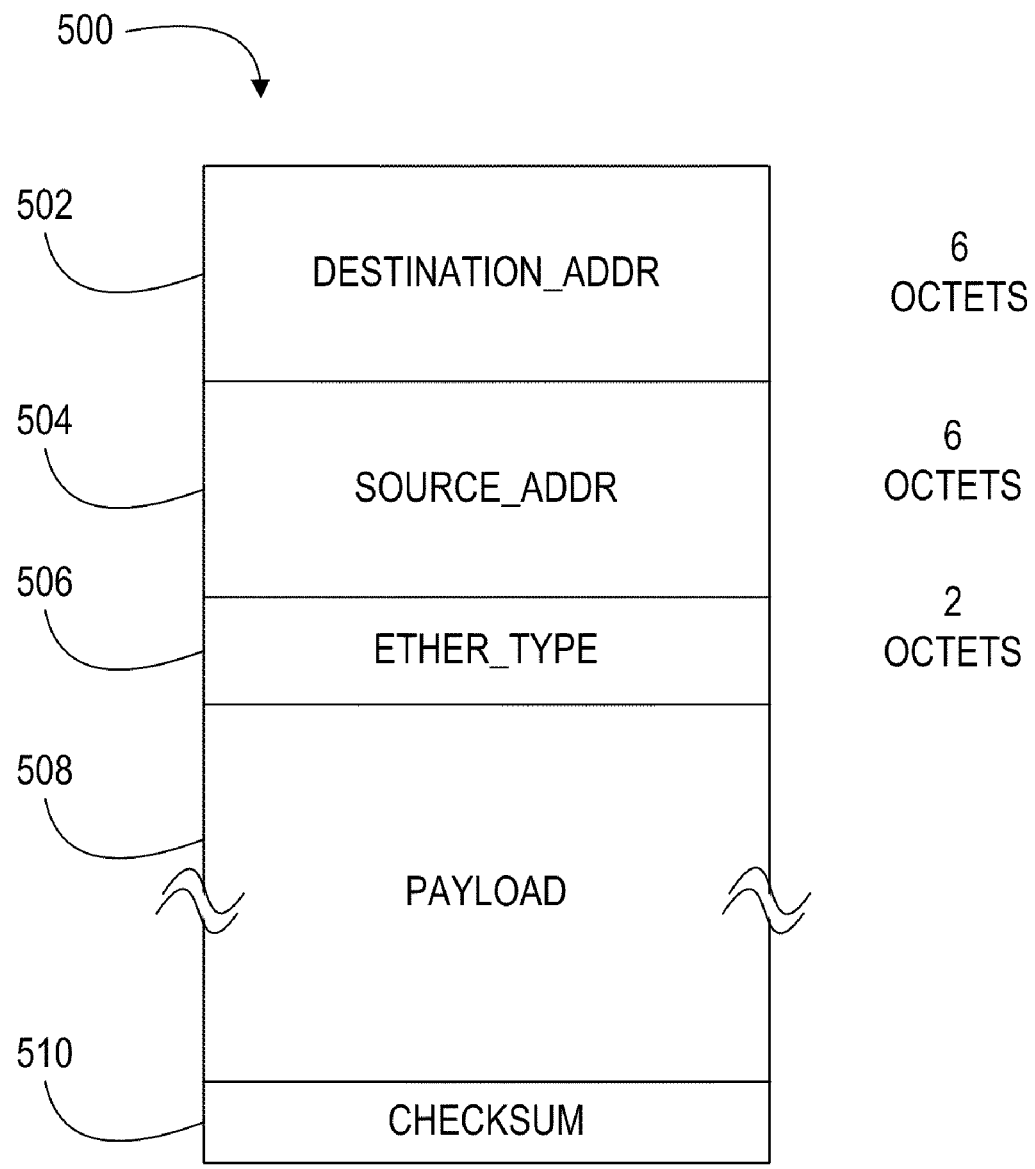
FIG. 5 illustrates a data packet for use in a distributed network.

FIG. 5 illustrates a data packet 500 for use in a distributed network. The data packet 500 includes a destination address field (DESTINATION_ADDR) 502 which typically contains either a unicast Ethernet destination address, or the Ethernet broadcast address (0xffffffff). For discovery packets, the field 502 value is either a unicast or a broadcast address. For PPP session traffic, the field 502 value contains the peer's unicast address as determined from the discovery stage.

A source address field (SOURCE_ADDR) 504 is also contained in data packet 500. This field 504 contains the Ethernet media access control (MAC) address of the source device. The ETHER_TYPE field 506 is set to a first value during the discovery stage, or to a second value during the PPP session stage. The payload field 508 contains the Ethernet payload for PPPoE, and is discussed in detail in FIG. 6. The checksum field 510 serves to verify packet integrity.

FIG. 6 illustrates an illustrative Ethernet payload that may be used with PPPoE. The VERSION field 602 is four bits, and identifies the version number of the PPPoE specifications, e.g., 0x1. The TYPE field 604 is four bits, and identifies the Ethernet type for a given version of PPPoE specifications. The CODE field 606 is eight bits, and the CODE field value depends upon whether discovery stage or PPP stage is in effect.

The SESSION_ID field 612 is 16 bits, and is an unsigned value in network byte order. For a given PPP session, the field 612 is fixed, and defines a PPP session along with the Ethernet source address (504 in FIG. 5) and destination address (502 in FIG. 5). In the discovery stage, the SESSION_ID field 612 has a different value depending upon the type of discovery packet in which field 612 is contained. The LENGTH field 610 is 16 bits having a value, in network byte order, that indicates the length of the PPPoE payload 608.

A PPPoE payload 508 contains zero or more tags. A tag is a type-length-value (TLV) construct, and an example tag is shown in FIG. 7. The sample tag includes a TAG_TYPE field 702 that is a 16 bit field in network byte order. A list of tag types that may be present in the field 702 includes tag types end-of-list, service-name, AC-name, host-uniq, and AC-cookie tags. The TAG_LENGTH field 704 is 16 bits, and is an unsigned number in network byte order which indicates the length in octets of the TAG_VALUE 706.

IETF RFC 2516 defines the host-uniq tag as follows: "This tag is used by a host to uniquely associate an access concentrator response (PADO or PADS) to a particular host request (PADI or PADR). The TAG_VALUE is binary data of any value and length that the host chooses. It is not interpreted by the access concentrator. The host may include a host-uniq tag in a PADI or PADR. If the access concentrator receives this tag, it must include the tag unmodified in the associated PADO or PADS response." From the foregoing IETF definition, it should be clear that although the present disclosure utilizes a predefined tag, the tag is utilized in a unique way to identify CPE devices, as well as to collect CPE device information at the access concentrator or database server attached to the access concentrator, for network management purposes.

Figure 8:
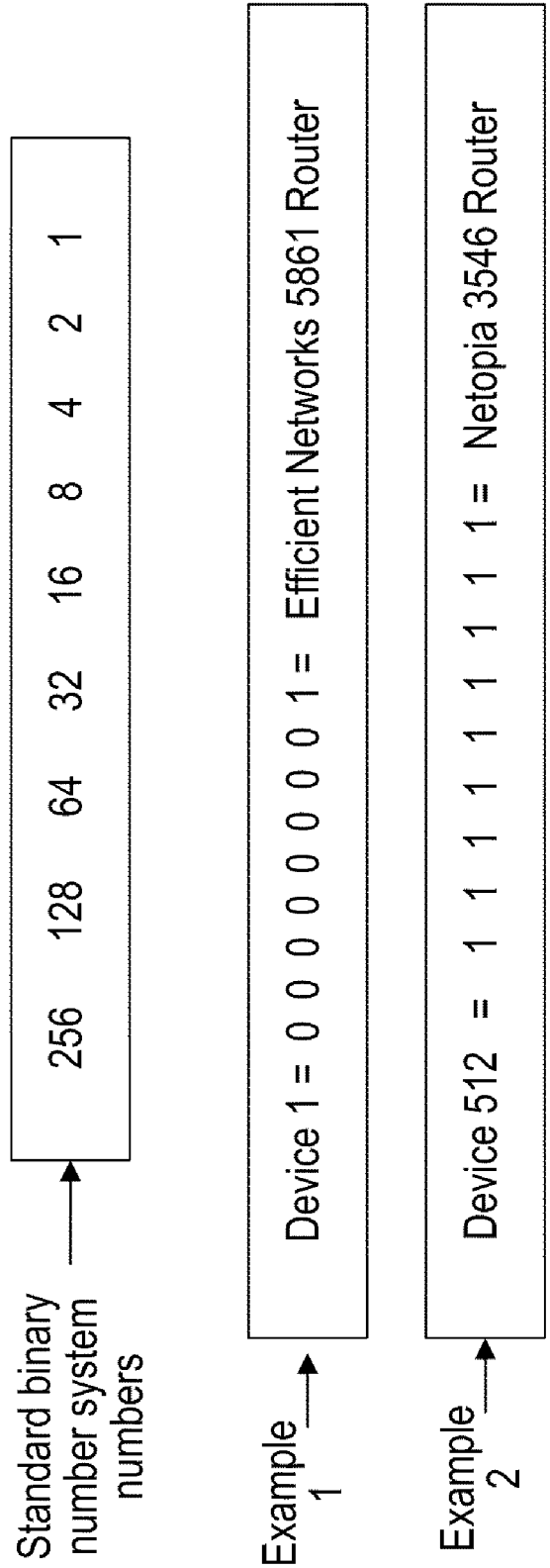
FIG. 8 illustrates an example of a nine binary bit CPE device identifier code embedded in the 0x0103 host-uniq tag.

An example of a nine bit binary CPE device identifier code embedded in a host-uniq tag is illustrated in FIG. 8. The CPE device identifier code uses numbers in the standard binary number system to produce any particular CPE device number between 0 and 512. In Example 1 of FIG. 8, an Efficient Networks 5861 Router has the binary number 000000001, making its device binary number equal to 1. In Example 2, a Netopia 3546 Router has the binary number 111111111, making its device binary number equal to 512. Using the examples of FIG. 8, when a device identifier code transmitted to the access concentrator/database from the CPE device is 111111111, the determination would be that this CPE device model type is a Netopia 3546 Router. Similarly, when the identifier code received is 000000001, the access concentrator would determine that the CPE device model type is an Efficient Networks 5861 Router.

Referring to FIG. 9, another embodiment of a host-uniq tag 900 is illustrated. The host-uniq tag 900 includes a first set of data (bits 1-8) 908, a second set of data (bits 9-16) 910, and a third set of data (bits 17-24) 912. The first set of data 908 forms a first field 902 that includes a device firmware description. The second set of data 910 includes a second field 904 that includes chipset information, and the third set of the data 912 forms a third field 906 that includes chipset code or firmware information. The device firmware field 902 includes a unique identifier for a particular type of firmware for a CPE device, such as a router for a DSL modem. Similarly, the chipset field 904 includes a unique identity of the chipset type used by the CPE device. The chipset code or firmware field 906 identifies the chipset code or firmware used by the chipset of the particular CPE device identified by the host-uniq tag 900. By identifying the particular type of equipment for the CPE device, technical support operators and customer support personnel may receive further information regarding the particular type of CPE devices and their equipment configurations throughout the network.

Figure 10:
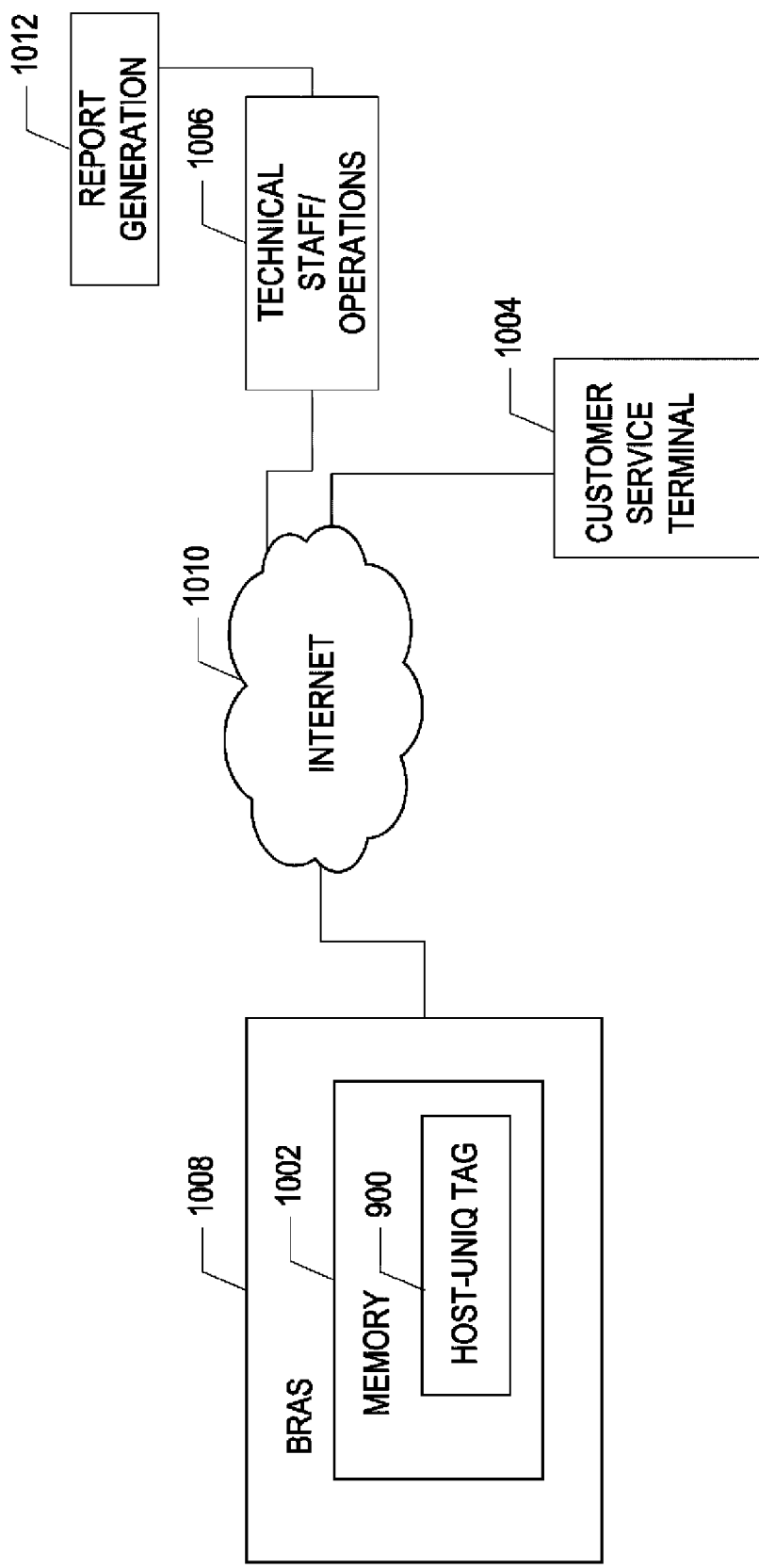
FIG. 10 illustrates a system that utilizes the host-uniq tag information.

Referring to FIG. 10, an illustrative system that may use the host-uniq tag 900 is shown. The system includes a broadband access server 1008, a computer network such as the internet 1010, a customer service terminal 1004, and a technical staff and operations systems 1006. The technical staff and operations system 1006 is coupled to a report generation module 1012. The operations system includes an operation station for use by operations personnel to access device information for the remote DSL CPE devices. The broadband server 1008 includes a memory 1002 that stores the host-uniq tag 900. The host uniq-tag 900 is stored in the memory 1002 upon retrieval from remote CPE devices using the point-to-point over Ethernet protocol during the discovery phase. The host-uniq tag 900 may be retrieved and distributed to either the customer service terminal 1004 or the operation system 1006 via the internet 1010.

The customer service terminal 1004 provides a display screen for customer help desk personnel that are assisting far end customers such as DSL subscribers with connectivity and other service issues. The customer service terminal 1004 may display to the customer support personnel information regarding the remote CPE device such as a particular device's firmware, chipset or chipset code firmware as determined by the host-uniq tag 900. Similarly, the technical staff and operations system 1006 may retrieve the host-uniq tag 900 and evaluate the tag 900 to determine CPE equipment information throughout the network. The technical staff may use such information for troubleshooting and operations personnel may use such information for providing technical support as well as equipment updates and other technical deployments. For example, when the operations staff evaluates network performance and errors, the staff may characterize CPE equipment failures based on the particular information within the host-uniq tag, such as the particular device firmware, chipset, and chipset codes in use. A network report of the various distributed CPE units may then be prepared and presented by the report generation module 1012. In such manner, operations personnel and technical staff may evaluate performance of the CPE devices and different equipment types as well as chipsets and firmware deployed within the network to provide enhanced technical performance and capabilities.

Figure 11:
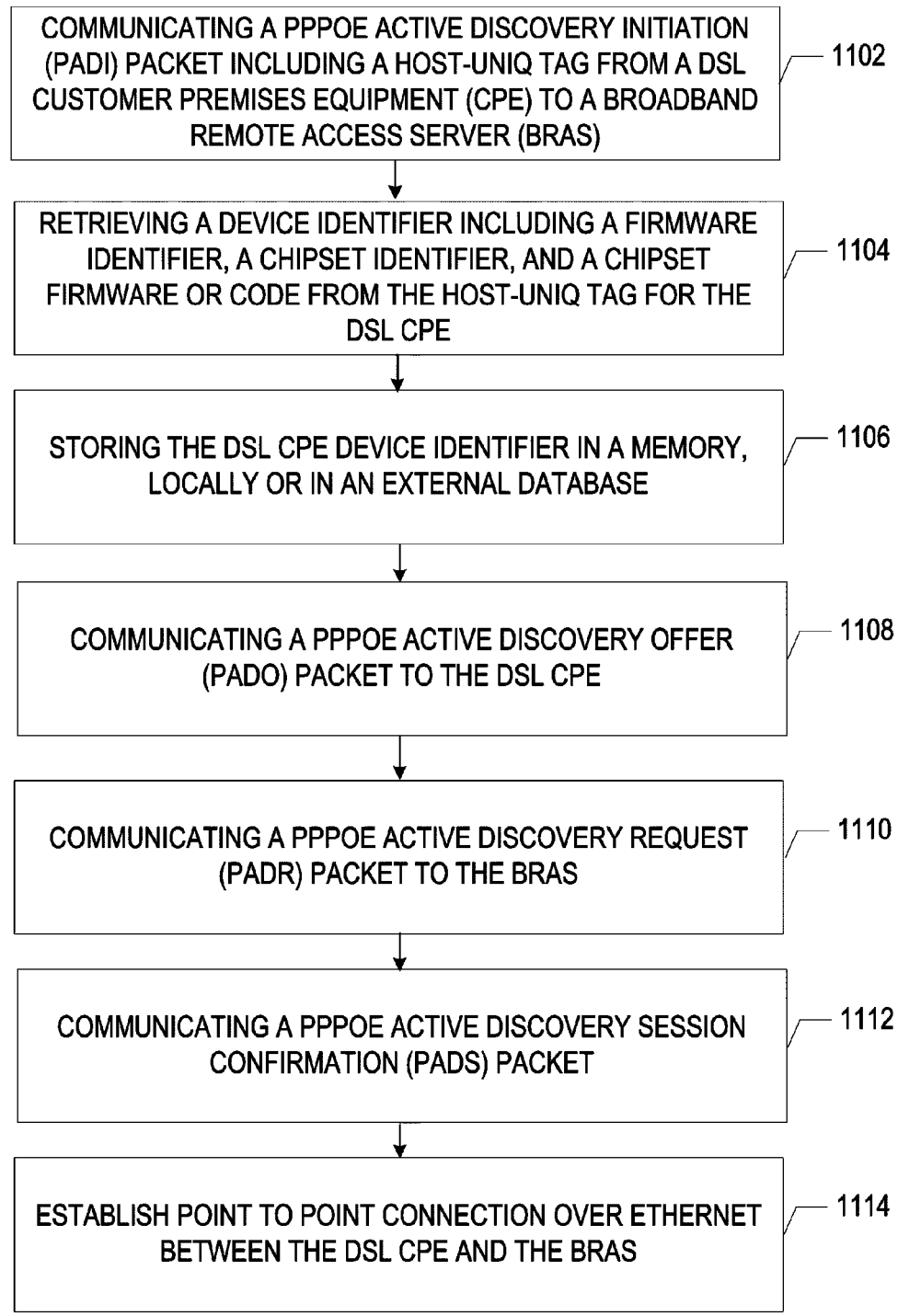
FIG. 11 is a flow chart that illustrates a method of accessing DSL CPE information.

Referring to FIG. 11, a method of communicating the host-uniq tag is illustrated. A PPPoE (Point-to-Point over Ethernet) active discovery initiation (PADI) packet including a host-uniq tag from a DSL customer premise equipment (CPE) device is communicated to a broad-band remote access server (BRAS), at 1102. A device identifier that includes a firmware identifier, a chipset identifier, and a chipset firmware code from the host-uniq tag is then retrieved for the particular DSL CPE identified, at 1104. The DSL CPE device identifier is stored in a memory either locally or at an external database, at 1106. A PPPoE active discovery offer (PADO) packet is then communicated to the DSL CPE, at 1108. A PPPoE active discovery request (PADR) packet is communicated to the BRAS, at 1110, and a PPPoE active discovery session confirmation (PADS) packet is communicated, at 1112. The point-to-point connection is then established over the Ethernet between the DSL CPE and the BRAS, at 1114.

Figure 12:
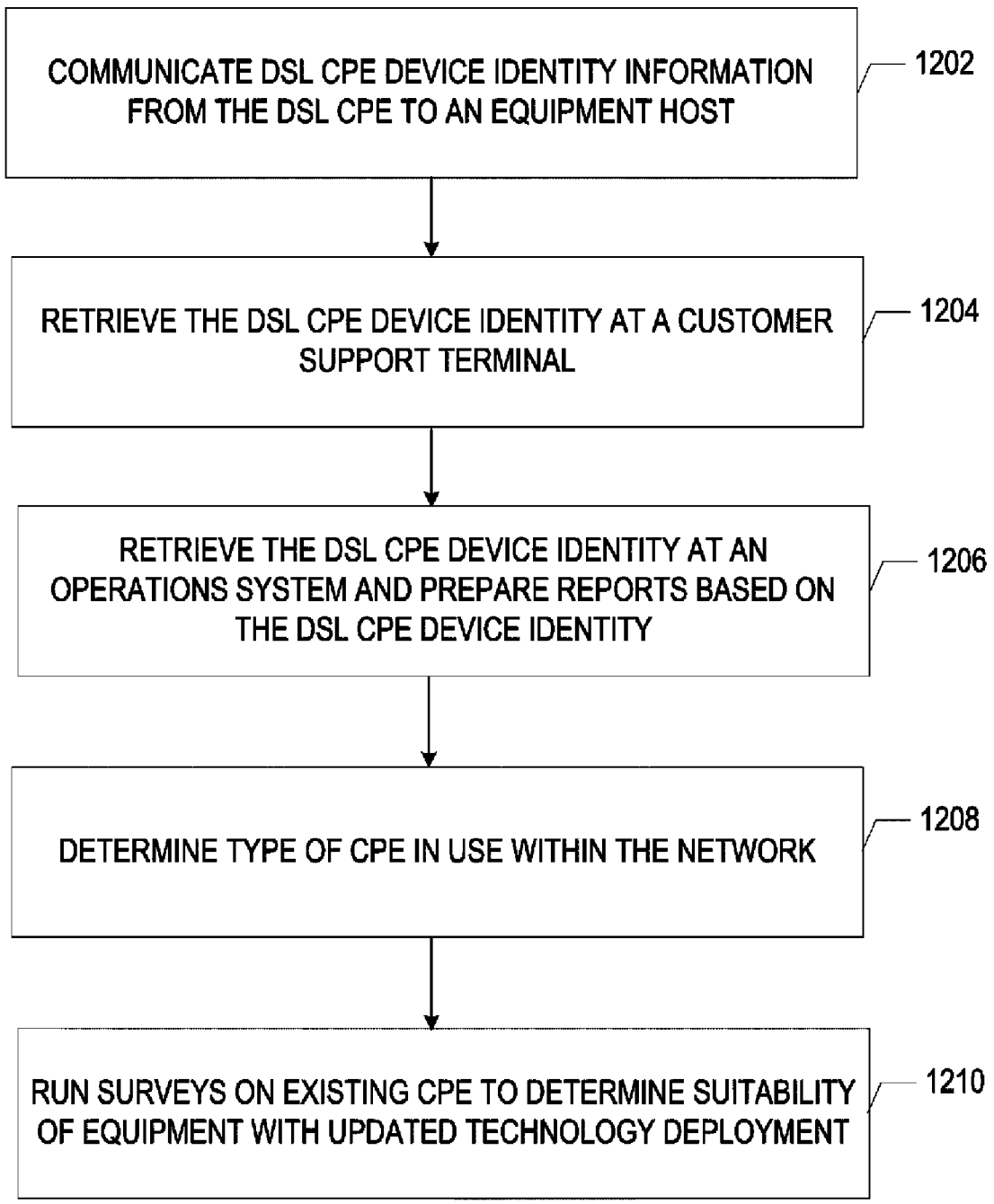
FIG. 12 is a flow chart that illustrates use of the host-uniq tag of FIG. 9

Referring to FIG. 12, a method of retrieving and using the host-uniq tag that provides a CPE device identifier is illustrated. Device identity information from a DSL CPE is communicated to an equipment host, at 1202. The DSL CPE device identity is then retrieved at a customer support terminal, at 1204. The DSL CPE device identity is retrieved in an operations and technical support system and reports are prepared based on the DSL CPE device identity, at 1206. A device type of the DSL CPE is then determined within the network based on the device identity, at 1208, and surveys may be performed on the existing CPE devices within the network to determine suitability of such equipment with respect to updated technology deployments, at 1210.

Thus, a system that uniquely identifies a device identity and equipment types including device firmware, chipset types, and chipset codes or firmwares for particular DSL CPE deployments may be retrieved from a variety of units deployed within a distributed network. A technical operations system customer service terminal may receive access to such device identifying information to provide for improved service and support of the network.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer implemented method, comprising:
receiving, at a broadband remote access server, a first request for information about a customer premises equipment device from a customer service terminal;
sending a second request for the information from the broadband remote access server to the customer premises equipment device;
receiving a point to point protocol over ethernet active discovery initiation packet at the broadband remote access server from the customer premises equipment device, wherein the packet includes a host-uniq tag including a device identifier associated with the customer premises equipment;
interpreting the host-uniq tag at the broadband remote access server during a point to point protocol over ethernet discovery stage to collect the information about the customer premises equipment device; and
sending the information about the customer premises equipment device to the customer service terminal.

2. The computer implemented method of claim 1, further comprising sending the device identifier of the customer premises equipment device to a display device that is coupled to the customer service terminal.

3. The computer implemented method of claim 2, wherein sending the device identifier of the customer premises equipment device to the display device further comprises:
identifying a type of firmware of the customer premises equipment device based on the device identifier; and
sending the type of firmware of the customer premises equipment device to the display device.

4. The computer implemented method of claim 2, wherein sending the device identifier of the customer premises equipment device to the display device further comprises:
identifying a type of a chipset of the customer premises equipment device based on the device identifier; and
sending the type of chipset of the customer premises equipment device to the display device.

5. The computer implemented method of claim 2, wherein sending the device identifier of the customer premises equipment device to the display device further comprises:
determining an identity of a manufacturer of the customer premises equipment device based on the device identifier; and
sending the identity of the manufacturer of the customer premises equipment device to the display device.

6. The computer implemented method of claim 2, wherein sending the device identifier of the customer premises equipment device to the display device further comprises:

determining an identity of a model number of the customer premises equipment device based on the device identifier; and sending the identity of the model number of the customer premises equipment device to the display device.

7. A broadband remote access server, comprising:

a processor;

a receiver to receive, from a customer premises equipment device, a point to point protocol over ethernet active discovery initiation packet including a host-uniq tag, wherein the host-uniq tag includes a device identifier field associated with the customer premises equipment device and to receive a point to point protocol over ethernet active discovery request from the customer premises equipment device, wherein the processor interprets the host-uniq tag during a point to point protocol over ethernet discovery stage to collect information about the customer premises equipment device; and a transmitter to transmit a point to point protocol over ethernet active discovery offer packet to the customer premises equipment device based on the device identifier field, and to send a point to point protocol over ethernet active discovery session packet to the customer premises equipment device to initiate an Ethernet-based communication session between the customer premises equipment device and the broadband remote access server.

8. The broadband remote access server of claim 7, wherein the device identifier field includes a first set of data, a second set of data, and a third set of data.

9. The broadband remote access server of claim 8, wherein the first set of data, the second set of data, and the third set of data each have a length of eight bits.

10. The broadband remote access server of claim 8, wherein the first set of data identifies a type of firmware of the customer premises equipment device.

11. The broadband remote access server of claim 8, wherein the second set of data identifies a type of a chipset of the customer premises equipment device.

12. The broadband remote access server of claim 8, wherein the third set of data identifies a chipset code of the customer premises equipment device.

13. The broadband remote access server of claim 7, wherein the device identifier field includes a number between 0 and 512 that identifies at least a manufacturer of the customer premises equipment device and a model number of the customer premises equipment device.

14. A broadband remote access server, comprising:

a processor;

an input interface to receive, from a customer premises equipment device, a point to point protocol over ethernet active discovery initiation packet including a host-uniq identifier associated with the customer premises equipment device, and to receive a point to point protocol over ethernet active discovery request from the customer premises equipment device, wherein the processor interprets the host-uniq identifier during a point to point over ethernet discovery stage to collect information about the customer premises equipment device; and an output interface to transmit a point to point protocol over ethernet active discovery offer packet to the customer premises equipment device based on the type of the customer premises equipment device, and to send a point to point protocol over ethernet active discovery session packet to the customer premises equipment device.

15. The broadband remote access server of claim 14, wherein the host-uniq identifier is stored at the broadband remote access server after the point to point protocol over ethernet active discovery initiation packet is received from the customer premises equipment device.

16. The broadband remote access server of claim 14, wherein the input interface is operable to receive a query from a customer service terminal, the query requesting the host-uniq identifier of the customer premises equipment device, wherein the customer service terminal is operable to enable diagnosis of a service issue associated with the customer premises equipment device.

17. The broadband remote access server of claim 16, wherein the output interface is operable to send the host-uniq identifier to the customer service terminal in response to the query from the customer service terminal.

18. The broadband remote access server of claim 16, wherein a manufacturer name and a model number of the customer premises equipment device is retrievable based on the host-uniq identifier in response to a query from the customer service terminal.

19. The broadband remote access server of claim 18, wherein the output interface is further operable to send the manufacturer name and the model number of the customer premises equipment device to the customer service terminal.

* * * * *